M. O. BOWERS.
AUTOMOBILE SIGNAL.
APPLICATION FILED MAY 28, 1918.
1,302,130.
Patented Apr. 29, 1919.
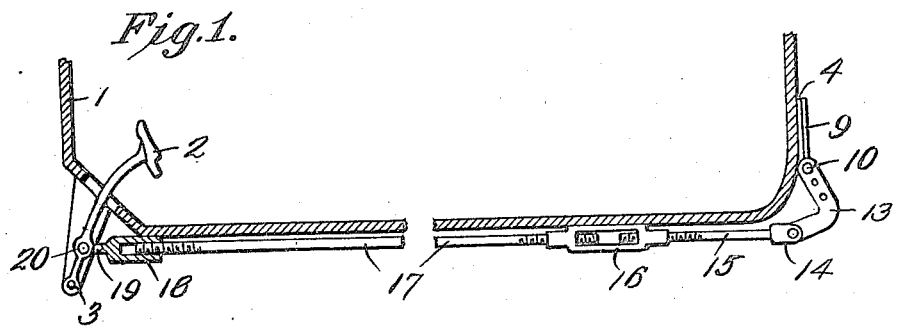
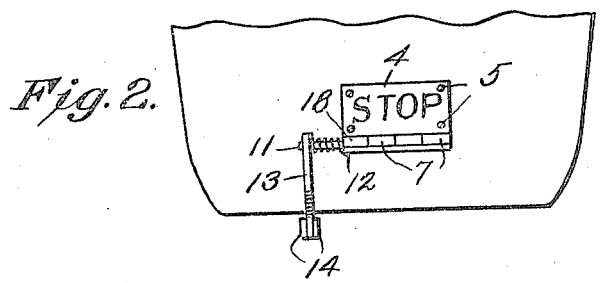
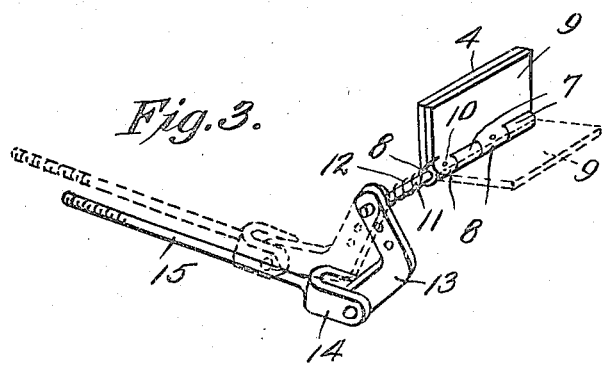
INVENTOR
Marvin O. Bowers,
WITNESSES
BY
ATTORNEY

UNITED STATES PATENT OFFICE.

MARVIN O. BOWERS, OF SUCCESS, SASKATCHEWAN, CANADA.

AUOTOMBILE-SIGNAL.

1,302,130. Specification of Letters Patent. Patented Apr. 29, 1919.

Application filed May 28, 1918. Serial No. 237,074.

*To all whom it may concern:*

Be it known that I, MARVIN O. BOWERS, a subject of the King of Great Britain, residing at Success, in the Province of Saskatchewan and Dominion of Canada, have invented certain new and useful Improvements in Automobile-Signals, of which the following is a specification.

This invention relates to certain new and useful improvements in vehicle signals.

The primary object of the invention is to provide a stop signal which is especially adapted to be used upon motor vehicles and is connected with the brake pedal in such a way as to be automatically displayed when the brake is operated to bring the vehicle to a stop.

Another object of the invention is to provide improved means for operatively connecting the signal with the brake pedal.

A still further object of the invention is to provide means for normally covering the stop signal during movement of the vehicle, said covering means being actuated, simultaneously with the brake pedal to disclose said signal to view at the time of bringing the vehicle to a stop.

A still further object of this invention is to provide a device of the character described which is easily operated, and is constructed in such a manner that the few simple parts thereof may be readily constructed and assembled at a minimum cost.

Other objects of the invention as well as the construction and specific arrangement of the various elements thereof will be more readily understood from the following description and accompanying drawings; in which:—

Figure 1 is a longitudinal sectional view taken through a conventional form of the vehicle body having my invention attached thereto.

Fig. 2 is an end view of a vehicle body showing the manner of attaching the stop signal, and Fig. 3 is a detail view of the portion of connection between the signal and the brake pedal.

It will be understood that the stop signal which I provide is capable of general application but in the present preferred embodiment, I have shown the same attached to a motor vehicle and operatively connected with the brake pedal. When used upon a motor vehicle, it will be understood that the device is directly connected with the brake pedal in such a way as to be automatically operated by the actuation of said pedal but, when the device is connected to a wagon or other form of vehicle it will be understood that an ordinary pivoted foot pedal may be substituted for the brake pedal to provide for the manual operation of the signal irrespective of whether the vehicle is brought to a stop or not. It will be equally obvious in this connection that instead of a stop signal any other form of direction indicating signal may be substituted.

In the present drawings, wherein the preferred embodiment of the invention has been illustrated, the numeral 1 designates a conventional form of vehicle body and 2 the usual brake pedal. The pedal 2 is pivoted at its lower end as indicated at 3 and may be connected with the brake in any approved manner. My specific invention comprises a plate 4 which is attached to the rear of the vehicle by means of screws 5 as indicated in Figs. 1 and 2 and is provided with suitable lettering indicating that the vehicle is about to stop. At its lower edge this plate is provided with suitable knuckles 7 which are alined with complementary knuckles 8 carried by a pivoted covering plate 9. A short transverse shaft 11 is extended through the alined knuckles of these two plates and is rigidly connected to the knuckles of the plate 9 by means of screws 10 or other detachable fastening means in order to cause swinging movement of this plate as later set forth. One end of the shaft is extended and has a coil spring 12 disposed thereon. One end of this spring is adapted to be engaged with one side of the plate 9 while the other end of said spring is adapted to bear against an L-shaped link 13 which has one end thereof rigidly fastened to the shaft 11. The opposite end of said link is pivotally received between the bifurcated end 14 of a rod 15. The opposite end of this rod 15 is threaded for engagement with one end of a turnbuckle 16 the opposite end of said turnbuckle 16 being threadedly engaged with a second similar rod 17. A sleeve 18 is threaded upon the end of the rod 17 opposite the said buckle 16 and is provided with an integral extension 19 which is pivotally secured to the brake pedal 2 above the pivot point of said pedal as indicated at the point 4. Owing to the provision of the turnbuckle 16 and the threaded connection between the rod 17 and sleeve 18 it will be evident that the rods 17 and 15 may be adjusted to the swing of the pedal 2. It will also be noted in this connection that the several parts of applicant's invention are detachably connected together so that any single element thereof may be removed and repaired or replaced.

From the foregoing it will be obvious that when the brake pedal 2 is swung forwardly to engage the brake, the rods 17 and 15 will move in the same direction and will swing the link 13 to rotate the shaft 11 in a clockwise direction. This rotation of the shaft 11 will obviously move the plate 9 away from the plate 12 thus disclosing the lettering or stop signal arranged upon the latter plate. When the brake pedal is released, the end of the spring bearing against the plate 9 will automatically return said plate to normal position against the outer face of the plate 4.

The foregoing description and the drawings have reference to what may be considered the preferred or approved form of my invention. It is to be understood that I may make such changes in construction and arrangement and combination of parts, materials, dimensions, et cetera, as may prove expedient and fall within the scope of the appended claim.

Having thus fully described my invention what I claim as new and desire to secure by Letters Patent, is:—

In combination with a vehicle body, of a signal comprising a plate fixed upon said body and having a signal indicating legend, said plate having spaced knuckles upon its lower edge, a covering plate having spaced apart knuckles interposed between the knuckles of the indicating plate, a shaft passing through said knuckles and being keyed to the knuckles of the covering plate, whereby as said shaft is turned, said covering plate will be moved to cover the said indicating plate or may be swung away to expose the same, an L-shaped link fixed upon the outer end of said shaft, a coiled spring surrounding said shaft and bearing upon said link and said covering plate for normally holding the covering plate in engagement with the indicating plate, a rod having a bifurcated end pivotally mounted upon said link, and means for drawing upon said rod for shifting the link, whereby said shaft will be turned to move said covering plate from the indicating plate against the tension of the coiled spring, although when the rod is released, said coil spring will return the covering plate to bear on the indicating plate.

In testimony whereof I affix my signature in presence of two witnesses.

MARVIN O. BOWERS.

Witnesses:
F. P. BOWERS,
R. MAULSON.

Copies of this patent may be obtained for five cents each, by addressing the "Commissioner of Patents, Washington, D. C."